(No Model.)
H. C. SELLE.
HAY STACKER.
No. 457,134.  Patented Aug. 4, 1891.
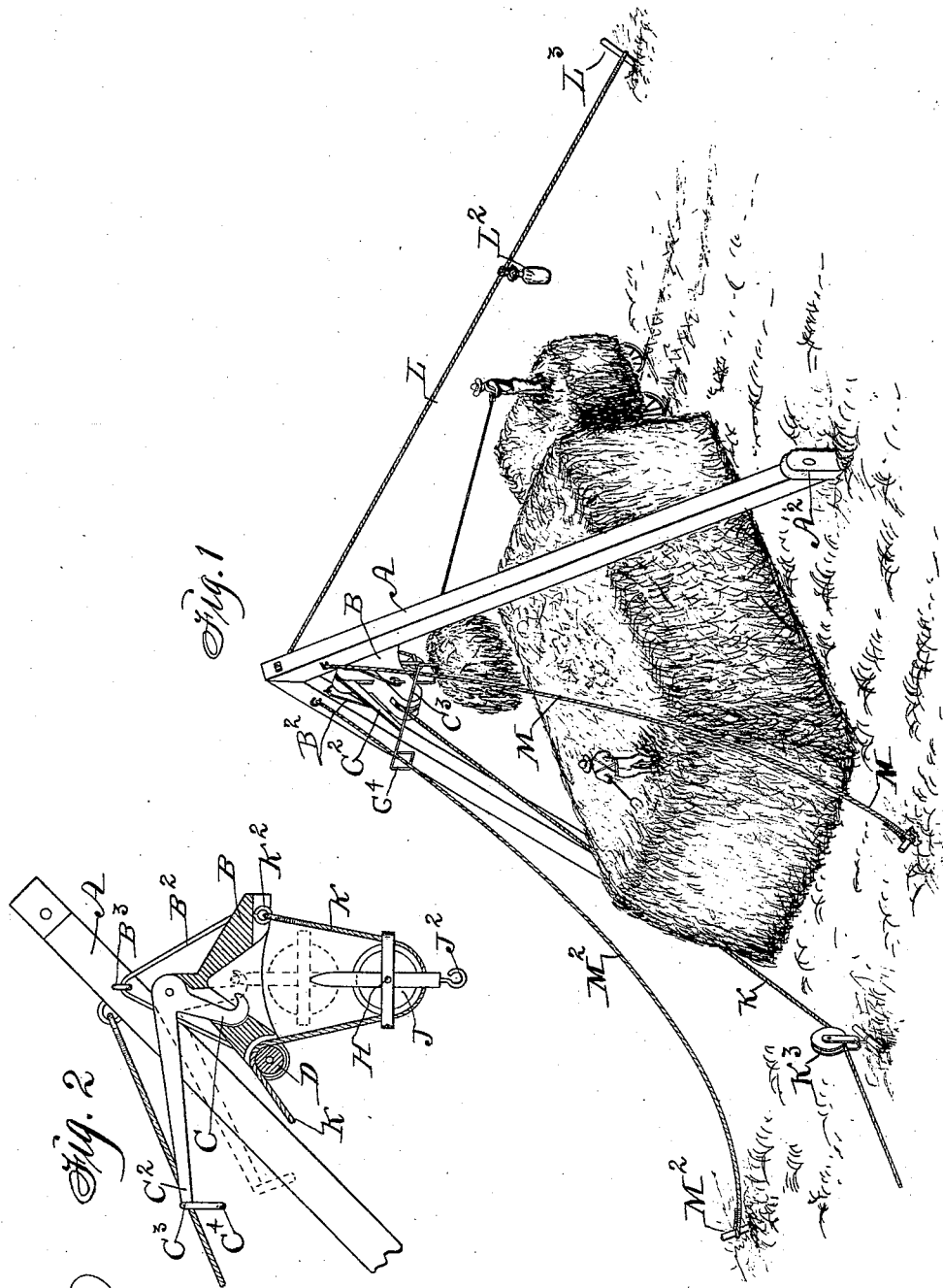
Witnesses:
W. J. Sankey
R. H. Orwig
Inventor: Herman C. Selle,
By Thomas G. Orwig, Atty.

UNITED STATES PATENT OFFICE.

HERMAN C. SELLE, OF GRINNELL, IOWA, ASSIGNOR OF ONE-HALF TO WILLIAM F. SMITH, OF SAME PLACE.

HAY-STACKER.

SPECIFICATION forming part of Letters Patent No. 457,134, dated August 4, 1891.

Application filed April 18, 1891. Serial No. 389,501. (No model.)

*To all whom it may concern:*

Be it known that I, HERMAN C. SELLE, a citizen of the United States of America, residing at Grinnell, in the county of Poweshiek and State of Iowa, have invented a new and useful Hay-Stacker, of which the following is a specification.

My object is to convey hay, straw, &c., from a wagon to a stack by horse-power; and my invention consists in the construction and combination of a fork-suspending device, ropes, pulleys, and other operative mechanism with a vibrating frame, as hereinafter set forth, pointed out in the claims, and illustrated in the accompanying drawings, in which—

Figure 1 is a perspective view of the complete device set up as required for practical use, and Fig. 2 is an enlarged sectional view of the operative mechanism of the fork-suspending device.

A is a V-shaped frame pivoted to the posts $A^2$, that are fixed in the ground.

B is the frame of the fork-suspending device adapted to be hung in the closed top of the frame A by means of irons $B^2$, fixed thereto, and eyebolts $B^3$, fixed to the frame A.

C is a trip-hook pivoted in a slot formed in the top and center of the frame B. It has an arm $C^2$ and a cross-piece $C^3$ at the free end of the arm, and frames $C^4$ at each end of the cross-piece, adapted to allow ropes to pass through, as shown in Fig. 1.

D is a pulley pivoted in a slot and bearings at one end of the lower corner of the frame B.

H is a metal pulley-block. At its top is an eye adapted to admit the hook C, and at its bottom is a hook $J^2$, adapted to suspend a hay-fork of common form.

J is a pulley journaled in the center of the pulley-frame or block H.

K is a rope fastened to the frame B by means of the eyebolt $K^2$, and passed under the pulley J and under the direction-pulley $K^3$, to be operated by a horse hitched to its free end.

L is a guy-rope attached to the apex of the frame A and to the stake $L^2$.

$L^3$ is a weight attached to the guy-rope L, as required to automatically return the frame to an inclined position.

M are guy-ropes attached at their upper ends to the frame A, and pass through the frames $C^4$ on the ends of the cross-arm $C^3$ of the trip-hook C, and their lower ends are attached to the stakes $M^2$.

In the practical use of my invention I attach a hay-fork of common form to hook J, and load it with hay or straw. I then attach a horse to the rope K, and when he advances the hay is lifted until the pulley-block strikes the frame B. The frame A is then moved to a vertical position, which slackens the guy-ropes M and allows the cross-arm $C^3$ to fall by its own weight, thereby forcing the hook C into the eye at the top of the pulley-block H. The pulley-block and loaded fork remain suspended until the hay-fork is tripped by the person on the wagon, which releases the weight on the frame A and allows the weight on the guy-rope L to automatically return the frame A to an inclined position and to stretch the guy-ropes M, and thereby elevate the cross-arm $C^3$, as required, to actuate and release the hook from engagement with the pulley-block, so that the pulley-block and fork attached thereto can descend and the fork again be loaded by a person on the wagon. By repeating the operation the load on the wagon can be rapidly transferred to the stack.

I claim as my invention—

1. In a hay-stacker, a fork-suspending device consisting of a frame adapted to be suspended in and carried by a pivotally-mounted derrick, a hook pivoted in an opening at the top of the frame, an arm extending horizontally from the hook, a cross-head at the free end of the arm, said cross-head having openings at its ends, ropes leading through said openings, a pulley-block having a vertical projection and an opening at the top thereof to admit the end of the hook, and a rope attached to one side of the lower portion of the frame and extended around under a pulley in the block, and from thence over a pulley on the other side of the frame, to operate in the manner set forth.

2. A hay-stacker comprising a pivotally-mounted V-shaped-frame derrick, a fork-suspending frame and trip device suspended in the top of said derrick, said trip device consisting of a pivoted hook having an arm and a cross-head on the end of the arm provided with openings, guy-ropes fixed to the top of the derrick and passed through the openings at the ends of said cross-heads, a pulley-block having an opening at its top to admit the end of the trip-hook, a rope fixed to the fork-suspending frame and passed under a pulley in the block and over a pulley in the suspended frame, and from thence under a directing-pulley located near the ground, and a guy-rope fixed to the top of the derrick and extended in an opposite direction from the other two guy-ropes, arranged and combined to operate in the manner set forth.

HERMAN C. SELLE.

Witnesses:
I. S. BAILEY,
J. E. WRIGHT.